(12) United States Patent
Cao et al.

(10) Patent No.: US 12,514,954 B2
(45) Date of Patent: Jan. 6, 2026

(54) MEDICAL POLYURETHANE FOAM DRESSING AND PREPARATION METHOD THEREOF

(71) Applicant: Zhende Medical Co., Ltd., Shaoxing (CN)

(72) Inventors: Liting Cao, Shaoxing (CN); Jianguo Lu, Shaoxing (CN); Chao Liang, Shaoxing (CN); Weijie Wei, Shaoxing (CN)

(73) Assignee: ZHENDE MEDICAL CO., LTD., Shaoxing (CN)

( * ) Notice: Subject to any disclaimer, the term of this patent is extended or adjusted under 35 U.S.C. 154(b) by 400 days.

(21) Appl. No.: 18/179,956

(22) Filed: Mar. 7, 2023

(65) Prior Publication Data

US 2023/0270913 A1    Aug. 31, 2023

Related U.S. Application Data

(63) Continuation of application No. PCT/CN2021/123520, filed on Oct. 13, 2021.

(30) Foreign Application Priority Data

Jun. 30, 2021 (CN) .......................... 202110743684.4

(51) Int. Cl.
*A61F 13/00* (2024.01)
*A61L 15/26* (2006.01)
(Continued)

(52) U.S. Cl.
CPC ............. *A61L 15/425* (2013.01); *A61L 15/26* (2013.01); *C09J 7/26* (2018.01); *C09J 7/29* (2018.01); *C09J 7/38* (2018.01)

(58) Field of Classification Search
None
See application file for complete search history.

(56) References Cited

U.S. PATENT DOCUMENTS

| 2013/0131206 A1 | 5/2013 | Niesten et al. |
| 2020/0054781 A1 | 2/2020 | Weiser et al. |

FOREIGN PATENT DOCUMENTS

| CN | 101730515 A | 6/2010 |
| CN | 204016620 U | 12/2014 |

(Continued)

OTHER PUBLICATIONS

CN 110802792 A Translation (Year: 2020).*

*Primary Examiner* — Kim M Lewis
(74) *Attorney, Agent, or Firm* — MUNCY, GEISSLER, OLDS & LOWE, P.C.

(57) ABSTRACT

A medical polyurethane foam dressing and a preparation method thereof are provided in this disclosure. The medical polyurethane foam dressing includes a polyurethane film, a hydrophilic polyurethane foam layer compounded on the polyurethane film, a release paper provided on the hydrophilic polyurethane foam layer, and a soft silicone composite layer located below the release paper. The polyurethane film consists of a release film and a PU resin layer or TPU resin layer coated on the release film. Products prepared according to the disclosure not only can serve to absorb wound exudate of pressure sore, but also provides single-side water proofing; and it is sticky and can be stably fixed on the wound without easy displacement, thus ensuring continuous and stable liquid absorption.

5 Claims, 3 Drawing Sheets

(51) Int. Cl.
*A61L 15/42* (2006.01)
*C09J 7/26* (2018.01)
*C09J 7/29* (2018.01)
*C09J 7/38* (2018.01)

(56) References Cited

FOREIGN PATENT DOCUMENTS

| | | | | | |
|---|---|---|---|---|---|
| CN | 109125784 | A | | 1/2019 | |
| CN | 110802792 | A | * | 2/2020 | ............ B29C 44/52 |
| CN | 111746007 | A | | 10/2020 | |
| EP | 0371736 | B1 | * | 4/1994 | ............ A61L 15/44 |
| WO | WO-2009047564 | A2 | * | 4/2009 | ............ A61L 15/52 |
| WO | WO2011006608 | A1 | | 1/2011 | |

* cited by examiner

MEDICAL POLYURETHANE FOAM DRESSING AND PREPARATION METHOD THEREOF

CROSS REFENCE TO RELATED APPLICATIONS

This application is a Continuation of co-pending Application No. PCT/CN2021/123520, filed on Oct. 13, 2021, for which priority is claimed under 35 U.S.C. § 120, and this application claims priority of application No. 202110743684.4, filed in China on Jun. 30, 2021 under 35 U.S.C. § 119; the entire contents of both which are hereby incorporated by reference.

TECHNICAL FIELD

The disclosure relates to a medical dressing, in particular to a medical polyurethane foam dressing and a preparation method thereof.

BACKGROUND ART

Patients who stay in bed for a long time, sit for a long time in wheelchairs, or need long-term surgery can't move freely, thus their local skin is pressed for a long time, which leads to poor blood circulation. Over time, necrosis and ulceration may occur to the skin after losing of nutrients, resulting in pressure sores/bedsores. Once the pressure sores/bedsores are formed, long-term care is required, and if the care is improper, not only pain of the patients is increased, but also infection may be caused in case of serious condition. Therefore, it is necessary to take timely protective measures for patients who are prone to the pressure sores/bedsores.

Compared with traditional gauze dressings, medical polyurethane foam has better resilience, slow pressure release and pressure absorption, and has superior liquid-seeping absorption performance, and in addition, it has good biological properties. It can be used for absorbing pus seeping from a pressure sore/bedsore wound after the pressure sore/bedsore wound occurs, accelerating healing of the wound and reducing damage to skin around the wound. However, existing polyurethane foam cannot provide single-side water proofing and is easy to displace on the wound. This disclosure is aimed to solve this problem.

SUMMARY

To solve shortcomings of related art, an object of the present disclosure is to provide a medical polyurethane foam dressing and its preparation method. This product not only can absorb wound exudate of pressure sore, but also provides single-side water proofing; and it is sticky and can be stably fixed on the wound without easy displacement, thus ensuring continuous and stable liquid absorption.

In order to achieve above objects, the disclosure employs the following technical scheme.

A medical polyurethane foam dressing includes a polyurethane film, a hydrophilic polyurethane foam layer compounded on the polyurethane film, a release paper provided on the hydrophilic polyurethane foam layer, and a soft silicone composite layer located below the release paper. The polyurethane film consists of a release film and a PU resin layer or TPU resin layer coated on the release film.

According to the medical polyurethane foam dressing described above, surface roughness of the polyurethane film after corona effect is 9 to 10.

According to the medical polyurethane foam dressing described above, a soft silicone composite layer is compounded on a hydrophilic polyurethane foam layer. A through hole is defined on the soft silicone composite layer.

According to the medical polyurethane foam dressing described above, the soft silicone composite layer is compounded on the polyurethane film and is located on both sides of the hydrophilic polyurethane foam layer.

The medical polyurethane foam dressing further includes a surface coating coated on a surface of the release paper. The surface coating is a silicon layer or a polymer material layer.

According to the medical polyurethane foam dressing described above, a thickness of the polyurethane film is 15 to 18 μm.

According to the medical polyurethane foam dressing described above, a thickness of the medical polyurethane foam dressing is 1.5 to 7 mm.

According to the medical polyurethane foam dressing described above, a thickness of the medical polyurethane foam dressing is 4 to 5 mm.

A preparation method of the medical polyurethane foam dressing includes following steps 1 to 4.

In step 1, a polyurethane film is prepared.

PU/TPU resin is coated on a release film material, with a coating amount of 15 to 30 g/m$^2$, which is dried to obtain a polyurethane film with a thickness of 15 to 18 μm; and then corona is performed with a corona value of 1 to 4 A and a running speed of 5 to 10 m/min, so that surface roughness of the polyurethane film after the corona is 9 to 10.

In step 2, hydrophilic polyurethane foam is prepared.

Formula of the hydrophilic polyurethane foam can be made in parts by weight, which includes: 60 to 87.5 parts of isocyanate prepolymer, 12 to 36 parts of water, 0.16 to 2.8 parts of surfactant and 0.34 to 1.2 parts of sodium bicarbonate.

Mixing is made by the formula, the isocyanate prepolymer and a aqueous phase substance which is consisted of the water, the surfactant and the sodium bicarbonate are stirred separately, with a stirring temperature of the isocyanate prepolymer of 25 to 35° C. and a stirring temperature of the aqueous phase substance of 15 to 25° C. A low-pressure foaming mixer is adopted to mix the isocyanate prepolymer and the aqueous phase substance at a rotating speed of 5,000 r/min, and pouring is carried out by connecting a conical plastic pouring head, and a discharging size and diameter of the pouring head can be adjusted according to a flow rate. Mixed materials are poured on a running polyurethane film, which is covered with a release paper, and a surface of the release paper is coated with a surface coating, which is a silicon layer or a polymer material layer. Mixed liquid poured on the release paper is leveled by an upper pressing plate and a lower pressing plate, which is then cured at a room temperature for 7 to 10 minutes, and then dried in an oven, and the dried polyurethane foam is the polyurethane foam of a composite single-sided waterproof and breathable polyurethane film.

In step 3, a soft silicone composite layer is provided.

The soft silicone composite layer is compounded with the hydrophilic polyurethane foam layer, with a compounding pressure range of 5 to 7 KPa and a running speed of 5 to 8 m/min. A through hole is defined on the soft silicone composite layer.

In step 4, the manufactured polyurethane foam dressing is cut, molded, packaged and sterilized so as to obtain the medical polyurethane foam dressing.

According to the preparation method of the medical polyurethane foam dressing, a gap between the upper pressing plate and the lower pressing plate is 0.05 mm to 15 cm, and the upper pressing plate and the lower pressing plate are provided with a shaping transition zone and a shaping zone. The shaping transition zone is of a bi-directional parabolic shape with a high middle and low sides, and the transition zone is a flat plate.

The disclosure has advantages as follows.

A structural design according to the disclosure not only can serve to absorb wound exudate of pressure sore, but also can realize single-side water proofing.

According to the disclosure, the soft silicone composite layer is arranged so that the dressing is sticky, can be stably fixed on the wound without easy displacement, and ensures continuous and stable liquid absorption.

The hydrophilic polyurethane foam according to the disclosure is of single-side water proofing.

In this disclosure, a preparation method of the polyurethane foam which can be continuously produced and molded in one step is provided, which solves a problem of processing complexity of single-sided waterproof and film-coated polyurethane foam that needs to be glued in steps and then compounded with films, so that the single-sided waterproof and film-coated polyurethane foam can be directly and continuously produced in one step, and a problem of poor air permeability of the single-sided waterproof and film-coated polyurethane foam can be solved, with a Moisture Vapor Transmission Rate (MVTR) for an upright-cup method can be kept above 1500 $g/m^2/24$ h. If a high permeability polyurethane film is selected, the MVTR for the upright-cup method can reach over 3000 $g/m^2/24$ h.

Figure 1:
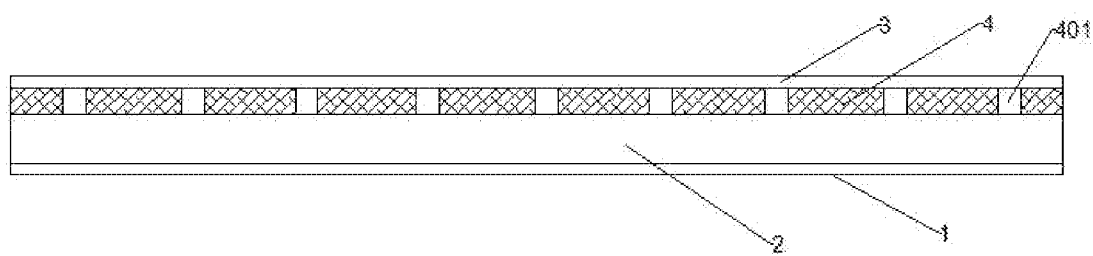
FIG. 1 is a structural diagram according to an embodiment of the present disclosure.

Reference numerals in the figures are illustrated as follows.

1 Polyurethane Film, 2 Hydrophilic Polyurethane Foam Layer, 3 Release Paper, 4 Soft Silicone Composite Layer, 401 Through Hole, 5 Surface Coating, 601 Shaping Transition Zone, 602 Transition Zone and 603 Base.

DETAILED DESCRIPTION

The disclosure will be described in the following in detail with reference to the drawings and specific embodiments.

As shown in FIG. 1, a medical polyurethane foam dressing includes a polyurethane film 1, a hydrophilic polyurethane foam layer 2 compounded on the polyurethane film 1, a release paper 3 provided on the hydrophilic polyurethane foam layer 2, and a soft silicone composite layer 4 located below the release paper 3. The polyurethane film 1 consists of a release film and a PU resin layer or TPU resin layer coated on the release film. As an embodiment, the release paper 3 can be made of Polyethylene (PE), polyethylene terephthalate (PET), Polypropylene (PP) and other materials.

A preparation method of the medical polyurethane foam dressing comprises the following steps 1 to 4.

In step 1, a polyurethane film is prepared.

PU/TPU resin is coated on a release film material, with a coating amount of 15 to 30 $g/m^2$, which is dried to obtain a polyurethane film with a thickness of 15 to 18 μm; and then corona is performed with a corona value of 1 to 4 A and a running speed of 5 to 10 m/min, so that surface roughness of the polyurethane film after the corona is 9 to 10.

Films with different light perceptions and quality can be made according to matte degree of a surface of the release film, and the polyurethane film 1 can be obtained after the coated resin is dried in solvent. The coating amount can be selected according to requirements for air permeability, strength and the like of a film material, currently it is preferably 15 to 30 $g/m^2$, and in order to increase the air permeability of a final product it is preferably 23 $g/m^2$, more preferably 17 $g/m^2$, and at this time, a thickness of the polyurethane film 1 obtained is 15 to 18 μm. In order to increase surface roughness, the corona can be carried out after coating, and the surface roughness of the polyurethane film 1 after the corona can be 9 to 10, so as to increase a binding force between the polyurethane foam and a surface of the polyurethane film 1 in manufacturing the waterproof and film-coated polyurethane foam.

In step 2, hydrophilic polyurethane foam is prepared.

Formula of the hydrophilic polyurethane foam can be made in parts by weight, which includes: 60 to 87.5 parts of isocyanate prepolymer, 12 to 36 parts of water, 0.16 to 2.8 parts of surfactant and 0.34 to 1.2 parts of sodium bicarbonate. As an example, the isocyanate prepolymer is toluene diisocyanate TDI, diphenylmethane diisocyanate MDI, hexamethylene diisocyanate HDI, or a mixture of two or more of them, which is not exhaustive. Any isocyanate prepolymer can be within a scope of protection of the present disclosure as long as it can serve to obtain the hydrophilic polyurethane foam. As an example, formula of the hydrophilic polyurethane foam can be made in parts by weight, which includes: 75 parts of the TDI prepolymer, 23.75 parts of water, 0.75 parts of the surfactant and 0.5 parts of $NaHCO_3$. As another example, formula of the hydrophilic polyurethane foam can be made in parts by weight, which includes: 70 parts of the TDI prepolymer, 28.2 parts of water and 1.8 parts of the surfactant.

Figure 6:
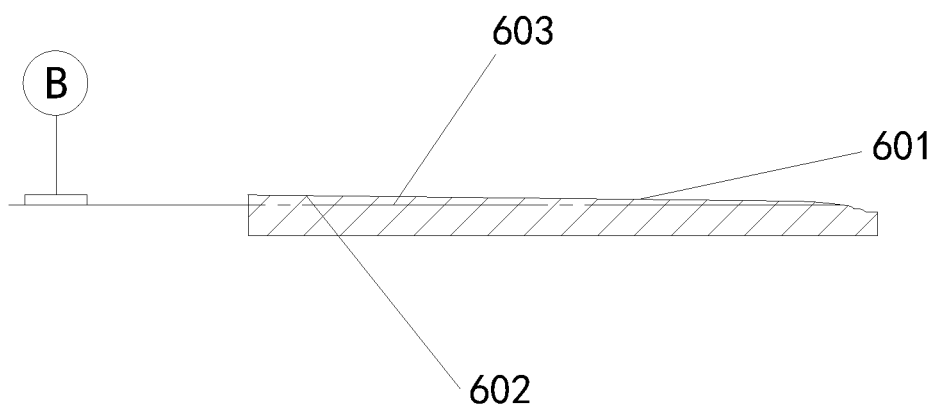
FIG. 6 is a cross-sectional view of an upper pressing plate and a lower pressing plate according to an embodiment of the present disclosure.

Mixing is made by the formula, he isocyanate prepolymer and a aqueous phase substance which is consisted of the water, the surfactant and the sodium bicarbonate are stirred separately, with a stirring temperature of the isocyanate prepolymer of 25 to 35° C. and a stirring temperature of the aqueous phase substance of 15 to 25° C., and materials are poured on the prepared polyurethane film. Specifically, a pouring method and parameters are as follows. A low-pressure foaming mixer is adopted to mix the isocyanate prepolymer and the aqueous phase substance at a rotating speed of 5,000 r/min, and pouring is carried out by connecting a conical plastic pouring head, and a discharging size and diameter of the pouring head can be adjusted according to a flow rate. Mixed materials are poured on a running polyurethane film which is covered with a release paper, and a surface of the release paper is coated with a surface coating 5, which is then subjected to leveling and curing at a room temperature for 7 to 10 min. The leveling specifically includes following content. The mixed liquid poured on the release paper passes between an upper pressing plate and a lower pressing plate, with a gap between the upper pressing plate and the lower pressing plate being in a range of 0.05 mm to 15 cm, which is currently used in a range of 0.05 mm to 8 mm according to requirements. The upper pressing plate and the lower pressing plate are provided with a shaping transition zone 601 and a shaping zone 602, which are deformed relative to a base 603. The shaping transition zone is of a bi-directional parabolic shape with a high middle and low sides, and the transition zone is a flat plate. As shown in FIG. 6, the shaping transition zone serve to over-shape with a parabolic curvature, so as to ensure uniform change and a uniform stress process in molding. The shaping transition zone is mainly serve to shape dispersed liquid to a certain extents. The pressing plates are designed according to foaming time for the formula, so as to produce polyurethane foam products with different thicknesses, which are then dried in an oven, and the dried polyurethane foam is the polyurethane foam of the composite single-sided waterproof and breathable polyurethane film 1, which can be rolled so as to finish the preparation. As a preference, the material can be adjusted in tension by a conveying roller, and deviation of the foam can be corrected by a deviation correcting device, so that the foam can be rolled uniformly without deviation. In rolling, the release paper can be compounded, which reduces bonding between two layers of foam, facilitates use of materials in a next process, with no need for secondary rewinding.

Figure 2:
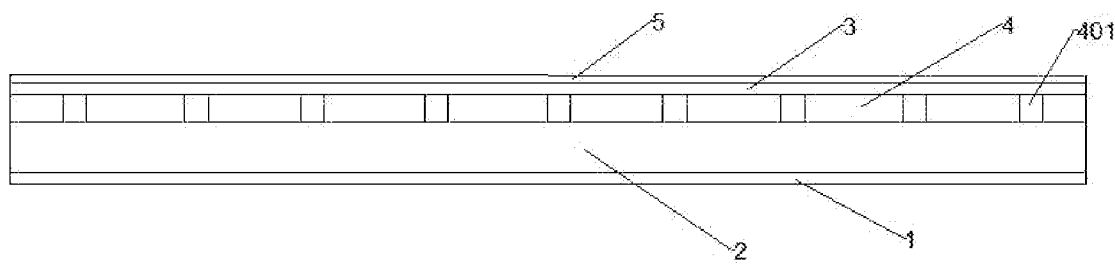
FIG. 2 is a structural diagram according to another embodiment of the present disclosure.
Figure 3:
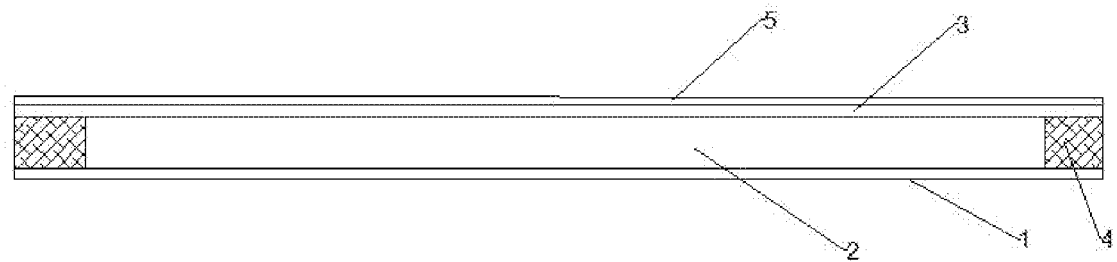
FIG. 3 is a structural diagram according to another embodiment of the present disclosure.
Figure 4:
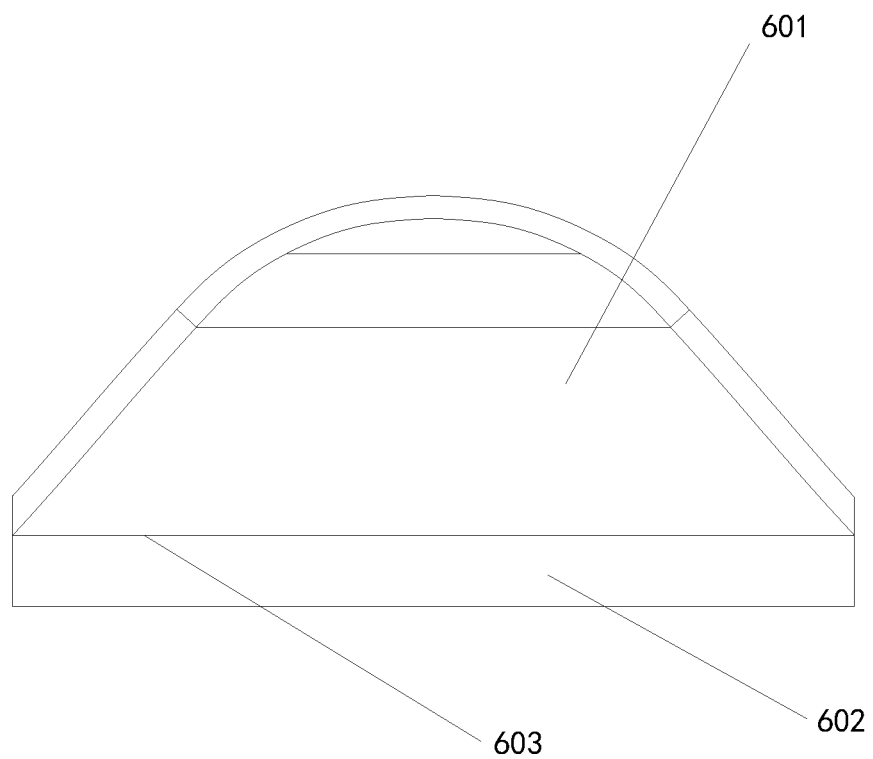
FIG. 4 is a schematic diagram of a contact surface between an upper pressing plate and an upper release paper during a preparation process of the present disclosure.
Figure 5:
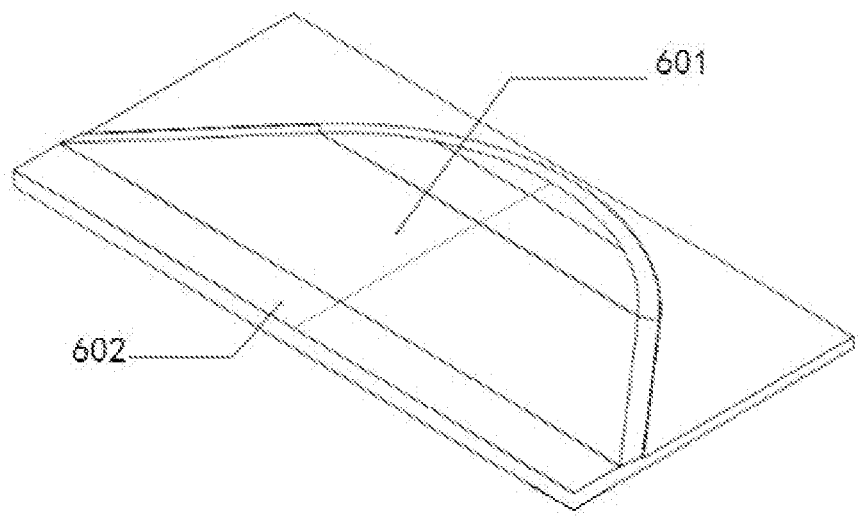
FIG. 5 is a top view of an upper pressing plate according to an embodiment of the present disclosure.

The surface coating 5 is a silicon layer or a polymer material layer as shown in FIGS. 2 and 3, preferably coated with a polymer material. The release paper 3 can be 140 to 170 g per square meter. And then curing is made at the room temperature for 7 to 10 min, and drying is made in an oven, and the dried polyurethane foam is the polyurethane foam of the composite single-sided waterproof and breathable polyurethane film 1. Medical polyurethane foam dressings with different thicknesses (1.5 to 7 mm) can be made according to a flow rate and a thickness of a scraper. Considering use for pressure sore prevention, a thickness of the medical polyurethane foam dressing is preferably 4 to 5 mm.

As an example, the surfactant can be one or more of low-foaming nonionic active materials such as PE800, PE6300, PE6200, PE6100, etc, which is not exhaustive herein.

In step 3, a soft silicone composite layer is provided.

The soft silicone composite layer 4 is compounded with the hydrophilic polyurethane foam layer 2, optimally with a compounding pressure range of 5 to 7 KPa and a running speed of 5 to 8 m/min. A through hole 401 is defined on the soft silicone composite layer 4. The soft silicone composite layer is provided to make the product sticky.

In step 4, the manufactured polyurethane foam dressing is cut, molded, packaged and sterilized so as to obtain the medical polyurethane foam dressing.

According to the disclosure, problems that a web cannot be continuously produced for block foam and its thickness is difficult to control are solved, and the product is produced by adopting a one-step molding method, so that a next process can be performed for the produced foam without secondary rewinding; and further a problem of air permeability loss caused by gluing and film covering is solved. The soft silicone material coated on the surface does not adhere to the skin, which is skin-friendly.

According to the disclosure, a thickness of a leveling part is controlled by the upper pressing plate and the lower pressing plate, and a shape of the upper pressing plate is designed according to a foaming speed so that thickness control can be carried out more accurately and difficulty in preparing ultra-thin materials in current production processes can be addressed, with a minimal thickness of 1 mm and thickness deviation of ±0.2 mm.

A structural design according to the disclosure not only can serve to absorb wound exudate of pressure sore, but also can realize single-side water proofing. According to the disclosure, the soft silicone composite layer 4 is arranged so that the dressing is sticky, can be stably fixed on the wound without easy displacement, and ensures continuous and stable liquid absorption.

The basic principles, main features and advantages of the present disclosure are shown and described in the above. It should be understood by those skilled in the industry that the above embodiments do not limit the present disclosure in any form, and all technical solutions obtained by equivalent substitution or equivalent transformation fall within the protection scope of the present disclosure.

The invention claimed is:
1. A preparation method of medical polyurethane foam dressing, comprising:
step 1, preparing a polyurethane film, which comprises:
coating PU/TPU resin on a release film material, with a coating amount of 15 to 30 g/m$^2$, which is dried to obtain a polyurethane film with a thickness of 15 to 18 µm; and then performing a corona treatment with a corona value of 1 to 4 A and a running speed of 5 to 10 m/min, so that surface roughness of the polyurethane film after the corona is 9 to 10;
step 2, preparing hydrophilic polyurethane foam, in which:
a formula of the hydrophilic polyurethane foam is made in parts by weight, which comprises: 60 to 87.5 parts of isocyanate prepolymer, 12 to 36 parts of water, 0.16 to 2.8 parts of surfactant and 0.34 to 1.2 parts of sodium bicarbonate; and
mixing the formula, the isocyanate prepolymer and a aqueous phase substance which consists of the water, the surfactant and the sodium bicarbonate are stirred separately, with a stirring temperature of the isocyanate prepolymer of 25 to 35° C. and a stirring temperature of the aqueous phase substance of 15 to 25° C.; a low-pressure foaming mixer is adopted to mix the isocyanate prepolymer and the aqueous phase substance at a rotating speed of 5,000 r/min, and pouring is carried out by connecting a conical plastic pouring head, and a discharging size and diameter of the pouring head is adjusted according to a flow rate; mixed materials are poured on a running polyurethane film, which is covered with a release paper, and a surface of the release paper is coated with a surface coating, which is a silicon layer or a polymer material layer; mixed liquid poured on the release paper is leveled by an upper pressing plate and a lower pressing plate, which is then cured at a room temperature for 7 to 10 minutes, and then dried in an oven, and the dried polyurethane foam is the polyurethane foam of a composite single-sided waterproof and breathable polyurethane film;
step 3, providing a soft silicone composite layer, in which the soft silicone composite layer is compounded with the hydrophilic polyurethane foam layer, with a compounding pressure range of 5 to 7 KPa and a running speed of 5 to 8 m/min, a through hole being defined on the soft silicone composite layer; and step 4, cutting, molding, packaging and sterilizing the manufactured polyurethane foam dressing so as to obtain the medical polyurethane foam dressing.

2. The preparation method of medical polyurethane foam dressing according to claim 1, wherein a gap between the upper pressing plate and the lower pressing plate is 0.05 mm to 15 cm, and the upper pressing plate and the lower pressing plate are provided with a shaping transition zone and a shaping zone; and the shaping transition zone is of a bi-directional parabolic shape with a high middle and low sides, and the transition zone is a flat plate.

3. The preparation method of medical polyurethane foam dressing according to claim 1, wherein a thickness of the polyurethane film is 15 to 18 μm.

4. The preparation method of medical polyurethane foam dressing according to claim 1, wherein a thickness of the medical polyurethane foam dressing is 1.5 to 7 mm.

5. The preparation method of medical polyurethane foam dressing according to claim 4, wherein a thickness of the medical polyurethane foam dressing is 4 to 5 mm.

\* \* \* \* \*